No. 711,630. Patented Oct. 21, 1902.
L. J. R. HOLST & C. C. LANGILL.
FOCAL PLANE SHUTTER.
(Application filed May 16, 1899.)
(No Model.)
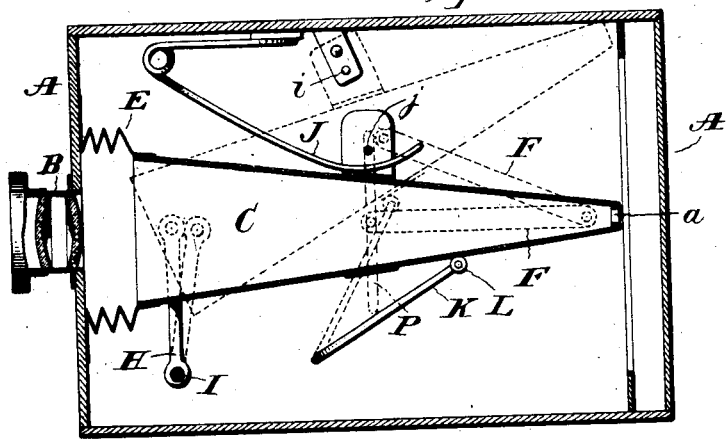
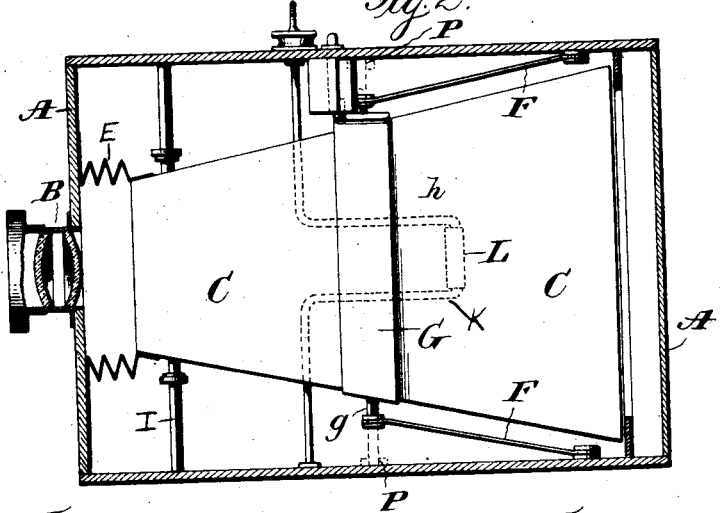
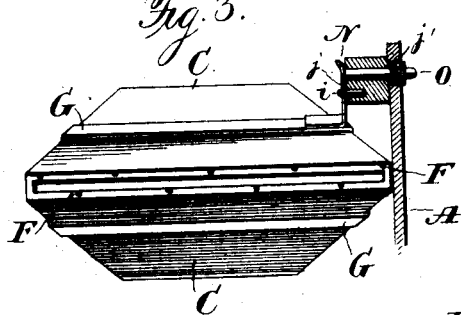
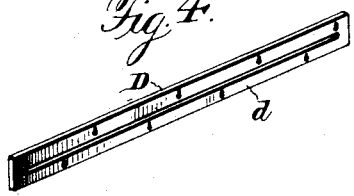
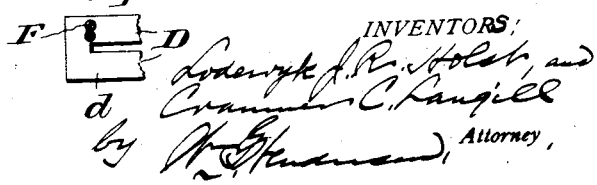
WITNESSES
Jas E. Hutchinson
Chester A. Baker
INVENTORS
Lodewyk J. R. Holst and
Crammer C. Langill
by ... Attorney

UNITED STATES PATENT OFFICE.

LODEWYK JAN RUTGER HOLST AND CRANMER COLUMBUS LANGILL, OF NEW YORK, N. Y.

FOCAL-PLANE SHUTTER.

SPECIFICATION forming part of Letters Patent No. 711,630, dated October 21, 1902.

Application filed May 16, 1899. Serial No. 717,093. (No model.)

*To all whom it may concern:*

Be it known that we, LODEWYK JAN RUTGER HOLST, a subject of the Queen of the Netherlands, and CRANMER COLUMBUS LANGILL, a citizen of the United States, both residing at New York, in the county of New York and State of New York, have invented certain new and useful Improvements in Focal-Plane Shutters; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to focal-plane shutters for cameras, and has primarily for its object to provide a construction in which the flat end of the shutter will move rapidly parallel with and close to the sensitive surface without the necessity or aid of a light-excluding material at that end. It has further for its object to provide simple and effective means for accomplishing the primary object stated.

To the accomplishment of the foregoing and such other objects as may hereinafter appear the invention consists in the arrangement and in the construction of parts of which an illustration is hereinafter given and which are then sought to be specifically defined by the claims, reference being had to the accompanying drawings, forming a part hereof, and in which—

Figure 1 is a vertical section through a camera embodying our invention. Fig. 2 is a longitudinal section through the camera with parts in full lines. Fig. 3 is a front elevation of the cone with a portion of the camera side in section, and Fig. 4 is a perspective one of a number of detachable plates used for regulating the size of the slit or opening in the end of the cone next to the sensitive surface or plate. Fig. 5 is a front view of a portion of one of the detachable plates.

In the drawings the letter A designates a camera-box, and B the lens-holder of any approved pattern. Within the camera is suspended a cone-shaped or tapering light receiving and transmitting shutter or tube C, adapted to receive the light at the lens end and throw it upon the sensitive plate or surface at the opposite end of the tube as that end sweeps over the sensitive surface. The tube C at the plate or sensitive-surface end widens to let in the required width of the sensitive plate or surface, while in the direction at right angles to such width it tapers from the opposite end down to the width of the slit or opening at the plate end of the tube, which slit or opening (designated by the letter $a$) may be of the depth desired and which may be regulated or widened by the employment of a strip or plate D, having a slit or opening $d$ of the desired depth and width and which may be attached to the plate end of the tube by key-shaped or otherwise formed openings $e$, formed in the strip or plate and adapted to fit over headed screws F in the end of tube C or otherwise detachably secured thereto. A number of these strips or plates may be provided, each having a different-sized opening or slit, so that the desired opening may be obtained. The tube C at the opposite or lens end is of a size to allow the lens to shed all of its light into the tube, and at that end a bellows or other form of light-tight or light-excluding material E is affixed to the end of the tube and to the front board of the camera, so that no light will enter the tube except what is shed into the same by the lens.

The cone-shaped or tapering tube is suitably supported within the camera-box, so that its end next to the sensitive plate or surface may sweep parallel with and close to such surface, thereby effecting an exposure similar to that given by an ordinary focal-plane shutter, but in a different manner. Various methods of suspending the tube to give such operation may be employed without departing from our invention. As a suitable means for the purpose we have illustrated in the drawings radius-rods F, fulcrumed at one end to the sides of the camera at or about the middle of the height of the sensitive plate and at the opposite end connected to the tube at a point on the sides thereof midway or substantially so between the end and the point of the forward suspension of the tube, as illustrated, for which purpose the ends of the radius-rods at such point may be connected to pintles g, extending from a strap or band G, which may pass around the body of the tube. The forward or lens end of the tube is suspended by links H, connected at one end to the cross-rod I and at the other end to the sides of the tube, as illustrated clearly in Fig. 1 of the drawings. This manner of suspending the tube permits its slitted end to have a sweeping movement parallel with and close to the sensitive surface, so as to effect the desired exposure, the dotted lines in Fig. 1 indicating the uppermost position of the tube and the full lines the central position, the lowermost position not being indicated, but being obvious from the construction and operation described.

Instead of using the supporting radius-rods for guiding the front end of the shutter we may form straight grooves, (indicated by the letter P and illustrated by dotted lines in Fig. 1 of the drawings,) such grooves being situated in the longitudinal center-line of the camera and formed in a suitable part of the camera, so that the pintles g may move therein, thus permitting the front end of the hollow cone-shutter to move freely back and forth in front of the sensitive surface or plate, as in the other form. This last-described form may be preferable in case the cone-shutter has to sweep through a larger angle than where the radius-rods are used.

For the purpose of accelerating the sweeping movement of the shutter across the sensitive surface some suitable means is employed. The means illustrated, although other means may be employed, consists of a spring J at one point, bearing against the inside of the camera and at another point against the tube C, so that when the tube is in its uppermost position the tension of the spring will cause the tube to move rapidly past the plate or sensitive surface.

After the tube has moved across the plate it is returned to its normal position by suitable means—for instance, by a lever K, which in the form illustrated is journaled in the opposite sides of the camera, with one end passing through one side for the attachment of a suitable handle by which the lever may be operated, the central portion of the lever lying beneath the tube and being looped, as shown at h, and provided with a roller L, bearing against the under side of the tube. Other means for returning the tube to its first position may be employed.

When the tube is restored to its normal position, it is there held against the tension of the spring or against the action of gravity, if no accelerating-spring is used, by a pin i, which extends from a block M, secured to the inside wall of the camera, which pin will enter a perforation j, formed in the spring-plate N, attached to the tube, and thus hold the tube in its normal position. To release the tube, so as to permit it to sweep in front of the sensitive plate or surface, the spring-plate N is pushed out of engagement with the pin i by a push-button O, which may be retracted by a suitable spring j.

Under the general construction and arrangement and operation of the hollow cone-shaped or tapering shutter illustrated and described the light admitted at the lens end of the shutter is transmitted through the hollow shutter and out through the slitted end of the same to the plate or sensitive surface as the slitted end sweeps in front of the plate parallel therewith and close thereto, thereby effecting the desired exposure and without the necessity or aid of light-tight woven material, as in other focal-plane shutters.

We have illustrated and described suitable and preferred means for moving the shutter, restoring it to its normal position, and holding it there until the exposure is to be effected; but changes can be made without departing from the essential features of our invention. It is also obvious that the speed of acceleration of the shutter can be varied or controlled by using an accelerating-spring of greater or less degree of tension.

Having described our invention and set forth its merits, what we claim is—

1. A focal-plane shutter consisting of a hollow tube having an opening or slit in its end next to the plate or sensitive surface, and a plate secured to said end having an opening or slit registering with that in the tube for varying the size of the light-emitting opening in the shutter, substantially as described.

2. A focal-plane shutter consisting of a hollow tube suspended between the lens and plate or sensitive-surface ends of a camera and having a guiding member connected with the camera and with the tube substantially midway of the tube at its sides so that the end next to the sensitive surface may sweep across the plate or sensitive surface parallel therewith and in proximity thereto, substantially as described.

3. A focal-plane shutter consisting of a hollow tube suspended between the lens and plate or sensitive-surface ends of the camera and having a guiding member connected with the camera and with the tube substantially midway of the tube at its sides so that the end next to the plate or sensitive surface may sweep across the plate or sensitive surface parallel therewith and in proximity thereto, and means for accelerating the movement of the shutter, substantially as described.

4. A focal-plane shutter consisting of a hollow tube suspended between the lens and plate or sensitive-surface ends of the camera and having a guiding member connected with the camera and with the tube substantially midway of the tube at its sides so that the end next to the plate or sensitive surface may sweep across the plate or sensitive surface parallel therewith and in proximity thereto, and means for restoring the tube to its normal position, substantially as described.

5. A focal-plane shutter consisting of a hollow tube suspended between the lens and plate or sensitive-surface ends of the camera and having a guiding member connected with the camera and with the tube substantially midway of the tube at its sides so that the end next to the plate or sensitive surface may sweep across the plate or sensitive surface parallel therewith and in proximity thereto, and means for supporting the tube in its normal position, substantially as described.

6. A focal-plane shutter consisting of a hollow tube suspended between the lens and plate or sensitive-surface ends of the camera and having a guiding member connected with the camera and with the tube substantially midway of the tube at its sides so that the end next to the plate or sensitive surface may sweep across the plate or sensitive surface parallel therewith and in proximity thereto, and means for supporting the tube in its normal position and releasing it when to sweep across the plate or sensitive surface, substantially as described.

7. A focal-plane shutter consisting of a hollow tube which widens between its ends and at right angles thereto tapers toward the light-emitting end of the tube, said shutter being suspended between the lens and plate or sensitive-surface ends of a camera and having a guiding member connected with the camera and with the tube substantially midway of the tube at its sides so that the end next to the plate or sensitive surface may sweep across the plate or sensitive surface parallel therewith and in proximity thereto, means for excluding light from the lens end of the tube other than what is recived from the lens, and means for restoring the tube to its normal position and supporting it in such position, substantially as described.

LODEWYK JAN RUTGER HOLST.
CRANMER COLUMBUS LANGILL.

Witnesses:
OTTO GOERZ,
GASTON ROYER.